United States Patent
Finsinger et al.

(10) Patent No.: US 12,179,404 B2
(45) Date of Patent: Dec. 31, 2024

(54) DEVICE AND METHOD FOR DEAERATING A FLATTENED TUBULAR FILM

(71) Applicant: HOSOKAWA ALPINE Aktiengesellschaft, Augsburg (DE)

(72) Inventors: Florian Finsinger, Augsburg (DE); Carlo Benedetti, Oligate Olona (IT); Mauro Belcastro, Turate (IT)

(73) Assignee: Hosokawa Alpine Aktiengesellschaft, Augsburg (DE)

( * ) Notice: Subject to any disclaimer, the term of this patent is extended or adjusted under 35 U.S.C. 154(b) by 0 days.

(21) Appl. No.: 17/950,354

(22) Filed: Sep. 22, 2022

(65) Prior Publication Data
US 2023/0100811 A1 Mar. 30, 2023

(30) Foreign Application Priority Data
Sep. 22, 2021 (DE) .................... 10 2021 124 559.1

(51) Int. Cl.
*B29C 48/92* (2019.01)
*B29C 48/00* (2019.01)
(Continued)

(52) U.S. Cl.
CPC ...... *B29C 48/0022* (2019.02); *B29C 48/0017* (2019.02); *B29C 48/10* (2019.02);
(Continued)

(58) Field of Classification Search
CPC . B29C 48/0018; B29C 48/0022; B29C 48/10; B29C 48/355; B29C 48/901;
(Continued)

(56) References Cited

U.S. PATENT DOCUMENTS

| | | | | |
|---|---|---|---|---|
| 4,983,337 A | * | 1/1991 | Kojoh | ............... B29C 55/28 425/141 |
| 8,246,899 B2 | | 8/2012 | Bosse | |

(Continued)

FOREIGN PATENT DOCUMENTS

DE  10 2019 127 454 A1  10/2020
DE  10 2019 127 455 A1  10/2020
(Continued)

OTHER PUBLICATIONS

Result of examination report for German Patent Application No. 10 2021 124 559.1 filed Sep. 22, 2021.
(Continued)

*Primary Examiner* — Xiao S Zhao
*Assistant Examiner* — Joseph S Leyson
(74) *Attorney, Agent, or Firm* — Paul D. Bianco; Gary S. Winer; Fleit Intellectual Property Law (57) ABSTRACT

A device and method for the production of a tubular film in a blown film method with a blown film line. It includes a lay-flat device and a take-off device with a pair of take-off rolls, in which the tubular film can be laid flat, and at least one deaerating device of the previously flattened tubular film. The deaerating device includes a movement device for a cutting device with cutting elements and is arranged in the transport direction of the flattened tubular film downstream of the pair of take-off rolls so that the flattened tubular film can be slit and deaerated by the deaerating device.

17 Claims, 4 Drawing Sheets

(51) Int. Cl.
*B29C 48/10* (2019.01)
*B29L 23/00* (2006.01)

(52) U.S. Cl.
CPC ...... *B29C 48/92* (2019.02); *B29C 2793/0036* (2013.01); *B29C 2948/92295* (2019.02); *B29C 2948/92438* (2019.02); *B29L 2023/001* (2013.01)

(58) Field of Classification Search
CPC . B29C 48/903; B29C 48/92; B29C 2948/922; B29C 2948/924; B29C 55/28; B29C 2948/92295; B29C 2948/92438
See application file for complete search history.

(56) References Cited

U.S. PATENT DOCUMENTS

| | | |
|---|---|---|
| 2001/0021425 A1 | 9/2001 | Lincecum |
| 2006/0027942 A1 | 2/2006 | Bosse |
| 2007/0194502 A1* | 8/2007 | Cree ...................... B29C 53/10 264/566 |
| 2022/0193973 A1 | 6/2022 | Althermeler |
| 2022/0193974 A1 | 6/2022 | Oberdalhoff |

FOREIGN PATENT DOCUMENTS

| | | | |
|---|---|---|---|
| GB | 744 977 A | 2/1956 | |
| WO | 2004/028788 A1 | 4/2004 | |
| WO | WO-2020144363 A1 * | 7/2020 | ............. A23K 40/25 |
| WO | 2020/201155 A2 | 10/2020 | |

OTHER PUBLICATIONS

European Search Report dated Feb. 3, 2023 for European Application No. 22 19 6401.8.

Examiner's Report dated Aug. 21, 2024 for German Application No. 10 2021 124 559.1, 7 pages.

* cited by examiner

DEVICE AND METHOD FOR DEAERATING A FLATTENED TUBULAR FILM

FIELD OF THE INVENTION

The invention is directed toward a device and a method for the production of a tubular film in a blown film method, with a blown film line comprising a lay-flat device and a takeoff device with a pair of take-off rolls in which the tubular film can be flattened, as well as at least one device for deaerating the previously flattened tubular film.

BACKGROUND

Tubular films are produced in the blowing method in blown film lines. For this purpose, plastic granules are melted in an extruder under pressure and temperature and fed to a film blow head. The plastic melt in the film blow head is uniformly distributed over the periphery and forced outward via an annular die. The nascent tubular film is then pulled in the longitudinal direction and inflated to the desired diameter in the transverse direction by increasing the internal pressure due to the air supplied into the film bubble. The tubular film is cooled with cooling air from one or more cooling rings from the outside and optionally also from the inside. A calibration cage arranged between the blow head and the takeoff device supports and guides the inflated tubular film. The tubular film is then flattened in a lay-flat device and then transferred to a reversing turner bar takeoff and the flattened film is optionally wound as tubular film onto a winder or as flat film onto two winding stations.

In coextrusion machines, several extruders are connected to a coextrusion blowing head so that multilayered films can be produced.

During the start-up of a blown film line, the annularly emerging melt is pulled lengthwise manually and then knotted to a starting web. The starting web is guided beforehand through the entire blown film line similarly to the transport of the film up to the winder. The web is then slowly pulled manually or by supporting the winder and possibly additional components (takeoff, pre-takeoff). During this process, the line parameters are continuously adjusted. These include the takeoff speed, output of the extruder, cooling. Once the film has been completely drawn through, it can be wound with the winder. The final product adjustments, such as the lay-flat width and film thickness as well as formula are then made. The same applies to the desired total output.

Air in the form of air bubbles and/or air pockets are often still found in the flattened tubular film because of the process, especially after the start-up of a blown film line or even during the process. These air inclusions interfere with the wrinkle-free guiding of the flattened tubular film web through the unit arranged downstream of the lay-flat device and/or additional treatment steps. Air pockets, for example, promote wrinkle formation and therefore damage the film. The film loses quality.

The removal of air pockets from the flattened tubular film has thus far been conducted manually during the start-up process of the blown film line. To do this, the machine operator had to climb onto the machine platform. Slits in the flattened tubular film tube allow the air to escape, so that a reduction in the quality of the film does not occur during the downstream process steps.

DE 10 2019 127 454 A1 discloses a system for improved insertion of a cutting device into a flattened film tube of a blown film line with a cutting device to slit only a first tube side of the film tube, especially the not yet flattened film tube. The invention also concerns a blown film line, as well as a method for production and preparation of at least two film webs.

DE 10 2019 127 455 A1 discloses a system with a device for slitting a film tube. A severing device with severing elements is provided upstream of a constriction which is connected downstream of a guide unit. The severing elements are guided to the film tube and form slits in one side of a partially flattened tubular film. The slits serve for deaerating the tubular film.

A shortcoming here is that the tube edges sometimes cannot be reached during slitting before the take-off roll, since the film sides are at a distance from each other. In addition, two cutting elements are guided on a carriage across the lay-flat width of the film, which is very time-consuming. Moreover, the area directly in front of the take-off roll is very important from a process engineering standpoint for ideal film guiding and flattening by means of rolls and bars.

For the widespread manual cutting, additional personnel expenditures are necessary for the operator and time delays occur up to the positioning of the production roll in the downstream winder.

SUMMARY OF THE INVENTION

One aspect of the invention is to provide an alternative to the prior art.

Accordingly, a device and a method for the production of a tubular film in a blown film method are disclosed herein.

In a blown film line of the type just described, the problem is solved according to the invention in that it includes a device for deaerating with a movement device for a cutting device with cutting elements, which is arranged in the transport direction of the flattened tubular film downstage of the pair of take-off rolls, so that the flattened tubular film can be slit and deaerated by the deaerating device.

The cutting of the flattened tubular film thus occurs directly after the take-off roll or pair of take-off rolls. This cutting preferably occurs automatically. Simultaneous cutting is accomplished at several locations of the flattened tubular film web over the entire lay-flat width of the tubular film web. In addition, several cutting rows can occur in succession in the transport direction of the tubular film. The slits serve for deaerating the flattened tubular film. In addition to deaeration directly during cutting, deaeration takes place at each downstream roll or roller in the transport direction of the tubular film.

The tubular film produced in a blown film line is flattened in a lay-flat device and guided through a pair of take-off rolls of a takeoff device and flattened to form a tubular film web.

The device for deaerating a tubular film produced and flattened in a blown film line includes at least the elements: movement device with cutting device and cutting device with cutting elements.

It is optionally supplemented by a protection device, such as a protective door or cover.

The protection device of the movement device with the cutting device is mounted to move, for example, via a hinge and is opened and closed by means of an actuator. The protection device can be designed as a cover and protects the operating personnel from reaching into the cutting device. This actuator is hereafter also referred to as actuator 1.

The movement device includes the cutting device, which can be moved on both sides by means of bearings in the take-off frame. The cutting device is connected to the bearings by means of levers. The movement device of the cutting device is equipped with at least one actuator.

The cutting device is connected in series to the movement device with two actuators. The movement device is supported on one side on the cutting device and on the other side on the takeoff frame or platform. One actuator of the series-connected actuators (hereinafter referred to as actuator 2) moves the cutting device from a parking position in the takeoff frame into a base position just in front of the flattened tubular film web, and an another actuator (hereinafter referred to as actuator 3) moves the cutting device, the cutting bar, from the base position to the tubular film web, the cutting position, so that the blades cut the flattened tubular film web. Slits are made from both layers of the flattened tubular film. Movement of the cutting device from the base position to the cutting position and back can be conducted several times in succession in order to make several rows of slits one behind the other in the transport direction of the film. The tubular film is deaerated by the slits. In addition, at each roll or roller downstream of the cutting device, air present in the flattened tubular film web is forced out of the film web.

In a specific embodiment, the movement of actuator 3 can also be assumed by actuator 2, as, for example, in a linear guide.

The actuators are arranged centrally offset to each other on the cutting device, the cutting bar and on the protection device, the cover. One actuator (actuator 1) moves the safety cover and two series-connected actuators (actuators 2 and 3) move the cutting bar. Actuator 2 then has the task of moving the cutting bar to the flattened tubular film directly in the transport direction of the film after the pair of take-off rolls. Actuator 3 moves the cutting bar into the film web and cuts it. In another embodiment, the actuators can also be arranged outside on the protection device and the cutting bar. Several spaced actuators can also be used over the width of the protection device and the cutting bar.

Pneumatic or hydraulic cylinders or motors are used as actuators for the protection device and the movement device. Manual actuation is also possible.

In another variant, linear guides with actuators can be used. They can be pneumatic, or also as motors with a belt drive or motors with gears. As an alternative, the movement device can also be operated manually via levers.

The cutting device, a cutting bar, has receptacles for cutting elements, for example, blades, spaced evenly relative to each other. The receptacles can be adjusted or set in the direction transverse to the transport direction of the film. The cutting elements are interchangeably arranged in receptacles, for example, by means of screws or clamping devices. In an alternative embodiment, the blades can also be made individually or jointly retractable.

They can also be connected without play to the cutting device.

In another embodiment, the cutting elements are not uniformly spaced over the width of the cutting device, but are, for example, more closely spaced in the center than on the outside. In another embodiment, the blades are spaced more narrowly on the outside than in the center.

The cutting device has at least one cutting element.

In a method for production of a tubular film in a blown film line of the type just described, the problem according to the invention is solved by slitting and deaerating the flattened tubular film by means of a deaerating device it has been drawn off the pair of take-off rolls.

The tubular film after its production in a blown film line is initially flattened in a lay-flat device to a tubular film web and guided through a pair of take-off rolls. The deaerating device of the flattened tubular film web is ideally arranged in the take-off, so that the slitting of the film in the transport direction of the flattened tubular film web occurs directly after the pair of take-off rolls and before the subsequent treatment device or a subsequent roll or roller. If the flattened tubular film web is to be slit, a cover or protection device, which covers the movement device with the cutting device in its parking position, is initially moved by means of an actuator. The device is arranged in the platform or frame of the takeoff. The protection device represents a safety device that prevents undesired intervention in the cutting device, the cutting bar. It is optional.

In a subsequent step, the movement device moves the cutting device in the direction of the flattened tubular film web from the parking position to the base position. This occurs with an additional actuator. In a further step, the cutting device with the cutting element, the blades, is pivoted into the flattened tubular film web with a third actuator, the cutting position, in order to slit both layers of the flattened tubular film web. This step can occur several times in succession by moving the cutting device back and forth by means of actuator 3. In a preferred embodiment, the blades are replaceable and uniformly spaced on the cutting device, the cutting bar.

After the film is slit, the trapped air can now escape through the slits, and it is additionally forced out by the rolls or rollers arranged downstream of the cutting in the film transport direction, so that air no longer affects the quality of the film during subsequent processing.

After cutting, the actuators 2 and 3 move the cutting device back into the parking position and cover the cutting device against intervention by a protection device.

The assembly of actuators 2 and 3 that move the cutting device is supported, on the one hand, on the cutting device and, on the other hand, on the takeoff frame or platform.

The cutting device is arranged in the transport direction directly after the pair of take-off rolls, since the pair of take-off rolls retains air from the film bubble. In the event that this is not successful, the cutting device is arranged after the pair of take-off rolls and directly before the next roll, since this is the location at which air inclusions form increasingly and for the first time. Air inclusions, such as air bubbles or air pockets, occur here for the first time. In order to reliably achieve complete removal of the air, the completely flattened tubular film is slit, i.e., through both layers. The objective is to remove the air as quickly and completely as possible, since the slit film is not to be used in subsequent processing of the film and is discarded. Cutting of the film is therefore carried out especially in the start-up process or in combination with a winder change in a downstream winder.

The device according to the invention has both functional elements and safety elements and maintenance capabilities. The safety element is the cover of the cutting device, which prevents intervention in the cutting elements.

For maintenance, the cutting device is initially moved upward, whereupon the cutting device is moved with actuator 2 into a maintenance position and the protection device tilted back again. The maintenance position corresponds to the base position. The blades can now be serviced, replaced, or realigned. After maintenance, the protection device is withdrawn and the cutting device brought back and the protection device closed.

Air pocket sensors can be incorporated in the film path after the pair of take-off rolls in order to detect air inclusions in the flattened film and then to perform cutting when an air bubble or air pocket is detected in the start-up process or during a winder change. The air pocket sensors are preferably arranged after the pair of take-off rolls in the film transport direction but before subsequently connected rolls and rollers. They are preferably arranged at critical sites with a larger wrap angle, for example, turner bars or deflection rolls with a wrap angle of, for example, greater than 120°.

Ideally, cutting and deaerating always occurs in the start-up process. In the case of a winder change, the cutting will occur before the winder change, and the slit film can be easily separated and discarded, since it is situated on the outermost layers of the winding and can be simply cut out with reduced waste. It is not to be used for subsequent processing.

As an alternative, the deaerating device can also be mounted in any position during subsequent film web travel, for example, before the pre-takeoff.

The pre-takeoff is arranged in front of the winder and pulls the flattened web through the blowing machine to the winder. Before pre-takeoff, additional air accumulation can therefore occur and require the use of the device.

There may also be a combination of several devices.

The deaerating device is arranged in the transport direction of the flattened tubular film downstream of the pair of take-off rolls, preferably directly downstream of the pair of take-off rolls.

The method for deaerating a flattened tubular film comprises the steps:

1. Opening of the protection device by means of actuator 1.
2. Movement of the movement device with cutting device from the parking position to the base position directly in front of the flattened tubular film. This occurs with actuator 2.
3. Moving of the cutting device from the base position into the cutting position. This occurs with actuator 3.
4. Cutting of the flattened tubular film.
5. Deaerating the flattened tubular film.
6. Movement of the cutting device from the cutting position into the base position. This occurs with actuator 3.
7. Movement of the movement device with cutting device from the base position into the parking position. This occurs with actuator 2.
8. Closure of the protection device by means of actuator 1.

Steps 4 and 5 can occur several times in succession.

Steps 1 and 5 are optional and a safety door can provide access to the takeoff here.

Steps 2 and 3 can optionally occur with an actuator.

The cutting position is achieved via a mechanical end stop. The end position can be queried via a proximity switch.

By slitting the tubular film, it can be deaerated at each subsequent roll or roller.

In the cutting position, several slits can now be made in parallel, according to the number of cutting elements, over the lay-flat width of the tubular film web. The blades then slit both sides of the flattened tubular film web. By moving actuator 3 forwards and backwards, several cutting processes can be conducted in succession, so that several slits can occur in a row, i.e., in succession in the film transport direction.

If actuator 3 is withdrawn, the cutting device is moved out far enough that the blades cut into the film sheet between the takeoff rolls and subsequent rolls. Depending on the number of blades, several parallel slits are simultaneously made over the lay-flat width of the flattened tubular film. The slit length is adjustable by machine operation. The number of slits in succession in the transport direction of the flattened tubular film and the time between slits is also adjustable via machine control. For further slits, the actuator 3 travels back into its base position. It then goes back to its cutting position in which simultaneous parallel slits are again made in the film web. The number of blades and their spacing can be adjusted by the operator according to experience. The device can also be manually controlled.

The device can be operated via the operating surface of the blown film line or via a separate operating unit. The following parameters can be set: slit length, number of slits in the film transport direction, and time of cutting.

Cutting can be carried out when all safety conditions are met, for example, with protection doors locked with safety switches. It can be ensured via a web tear sensor before the take-off roll or the pair of take-off rolls that a film is being conveyed through the machine. In addition, a takeoff speed of greater than 0 m/min can be required.

A message concerning completed cutting can occur in the machine display. Additional production parameters can be set or started with the first production film roll.

A maintenance mode can be operated for maintenance of the cutting device and the cutting elements, including the steps:

Step 1: Actuator 1 opens the protection device
Step 2: Actuator 2 moves the movement device with cutting device from the parking position to the base position, which corresponds to the base position
Step 3: Actuator 1 closes the protection device
Step 4: Work on the blades, for example, after release to open the safety doors to the takeoff frame for working in the hazard area
Step 5: Actuator 1 opens the protection device
Step 6: Actuator 2 moves the movement device with cutting device from the maintenance position into the parking position
Step 7: Actuator 1 closes the protection device
Step 8: Release for machine operation Steps 1, 3, 5 and 7 are optional and can also be accomplished by other known protection devices.

The maintenance mode can be activated, for example, directly at the takeoff on the cutting device. The following operations are suppressed if the maintenance mode is activated: starting of the take-off roll, pivoting of the counter-pressure roll in the takeoff, starting of reversal on the take-off or/and starting of the pre-takeoff or winder.

Such a deaerating device for flattened tubular film permits automatic cutting of the tubular film web with subsequent deaerating.

Parameters, such as the number of slits, slit length, and time between slits can be adjusted. The device is adapted to the blown film line in terms of its installation space, so that no additional installation space is needed and retrofitting of existing machines is possible.

The device during production is found in a safe parking position, and for a blade change or blade positioning, it is in a safe base or maintenance position.

All safety requirements, such as protection grates and protection doors, can be implemented.

BRIEF DESCRIPTION OF THE DRAWINGS

Additional details, features and advantages of the object of the invention are apparent from the dependent claims and the subsequent description of the corresponding drawings in which a preferred embodiment example of the invention is shown. In the drawing:

FIG. 1 shows a blown film line (1) with winder (24).

Figure 1:
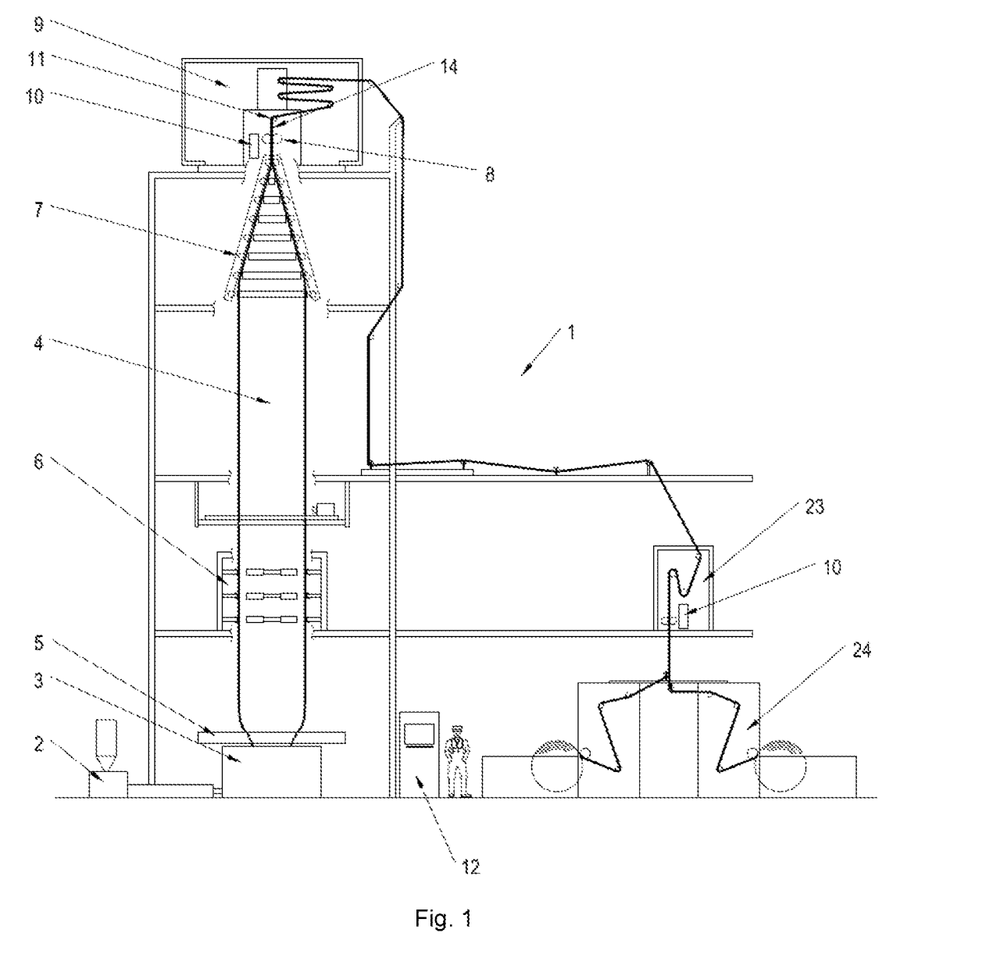
FIG. 1 shows a blown film line with deaerating device

Via a metering device, the plastic granules being processed are fed to an extruder (2) in which they are melted, homogenized and fed to the blow head (3). During production of multilayer films, several extruders are used according to the number of layers. The blow head (3) has an annular die from which the extruded plastic mass emerges. Through the blow head (3), a supply of cooling air occurs for inflating the tubular film (4). A cooling ring (5) is arranged after the blow head (3), which cools the tubular film (4) from the outside. A calibration frame (6), which is arranged after cooling ring (5) and before the lay-flat device (7), supports and guides the inflated tubular film (4). After solidification of the plastic, the tubular film (4) is flattened in the lay-flat device (7) and continuously drawn off and then positioned by means of pair of take-off rolls (8) of the takeoff, here a turner bar takeoff (9). The film is fed to winder (24) by means of a pre-takeoff (23) and rolled to film coils. If the tubular film before flattening is slit laterally on opposite sides, the film webs can also be wound by two winders.

The deaerating device (10) for tubular films produced in blown film lines is arranged directly downstream of the pair of take-off rolls (8) and upstream of the subsequent roll (11). Here it is a deflection roll before the turner bar system.

An additional deaerating device (10) can also be arranged upstream of the pre-takeoff (9) before the winder (24).

The entire film blowing process is regulated via the machine control (12), especially the drive, cooling air, the segmented control zone, which are situated in the cooling ring (5), in blow head (4) or subsequently, as well as the takeoff speed of the tubular film. The deaerating device (10) of the flattened tubular film (14) is also controlled from here.

Figure 2:
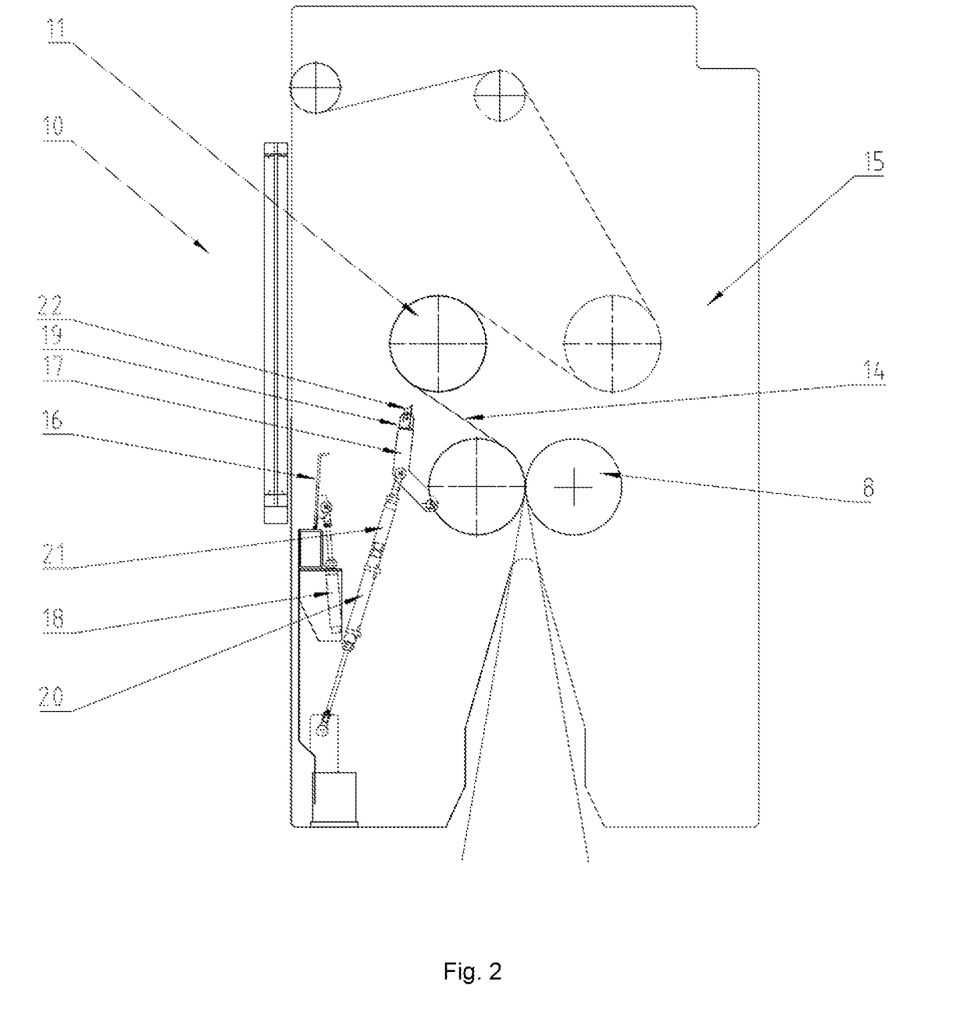
FIG. 2 shows a view of the deaerating device of a flattened tubular film

FIG. 2 shows a deaerating device (10) of flattened tubular film (14) in a takeoff (9). It is arranged in the takeoff frame (15). The cover (16) of the movement device (17) is fastened on the takeoff frame (15) via a hinge on its long side. The cover (16) is removed and returned with the actuator 1 (18), a pneumatic cylinder. The cover (16) covers the movement device (17), here a pivot device (17), with the cutting device (19).

The cutting device (19), a cutting bar, is mounted to be movable on its front via levers in the takeoff frame (15), the pivot device. The actuator 2 (20) and actuator 3 (21) are fastened in series on the cutting bar (19). The second fastening point of the two series-connected actuators (20, 21) is in the takeoff frame or platform. The actuators are arranged centrally in the device, actuator 1 (18) being arranged slightly offset relative to actuators 2 (20) and 3 (21).

The cutting bar (19) is provided with several uniformly spaced cutting elements (22), blades. The blades (22) are fastened with screws in the cutting bar (19). Cutting occurs after the pair of take-off rolls (8) and before the subsequent roll (11) of the takeoff (9). This roll (11) can be a component of a takeoff or a reversing turner bar takeoff, but also an annealing unit.

Figure 3:
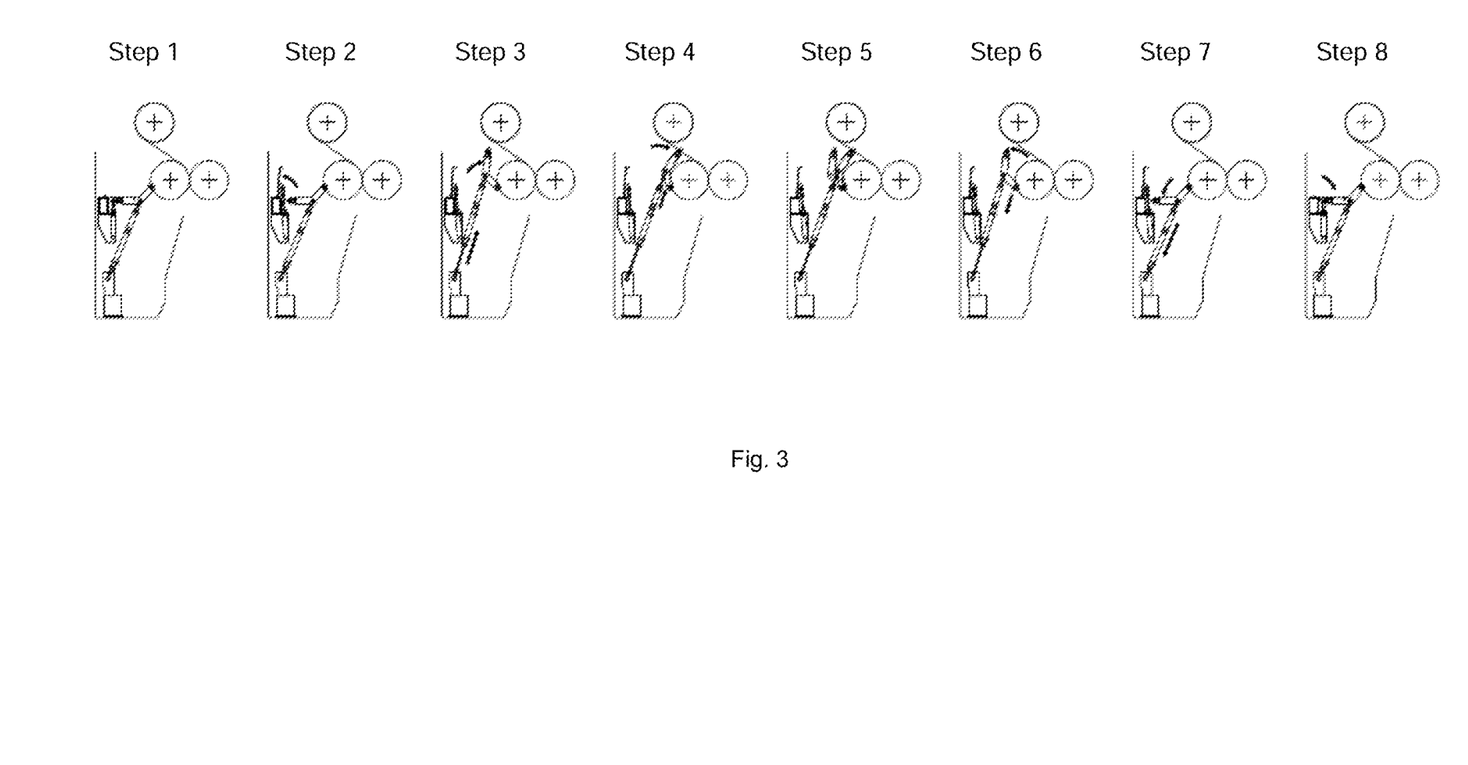
FIG. 3 shows the process steps for deaerating a flattened tubular film

In FIG. 3, the process steps for cutting and deaerating the film are shown (for clarity, the reference numbers that correspond to the technical features for FIG. 2 are omitted):

Step 1: Device in parking position, cover closed.

Step 2: Cover is opened with actuator 1.

Step 3: Actuator 2 moves the movement device with cutting device from the parking position into the base position at the level of the flattened tubular film being cut.

Step 4: Actuator 3 moves the cutting device into the tubular film web in the cutting position between the pair of take-off rolls and subsequent roll.

Step 5: Tubular film is slit with the blades of a cutting device once or several times in succession, and the air can escape.

Step 6: Actuator 3 moves the cutting device from the cutting position into the base position.

Step 7: Actuator 2 moves the movement device with cutting device from the base position to the parking position.

Step 8: Actuator 1 closes the cover.

Figure 4:
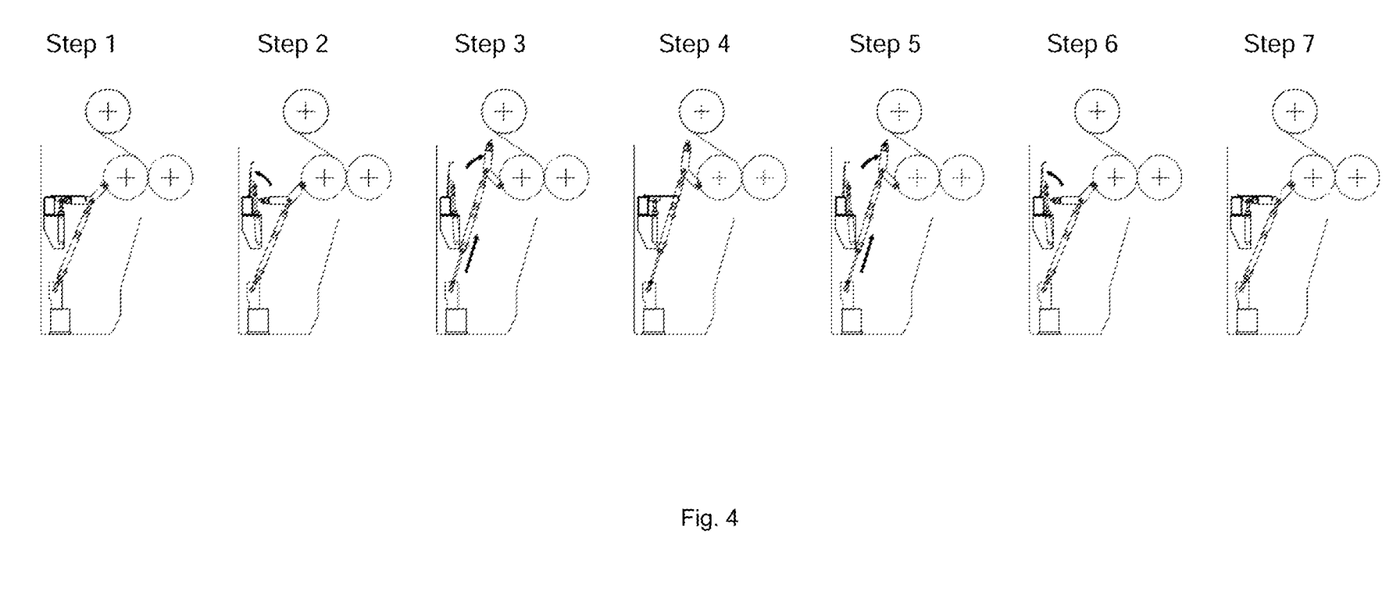
FIG. 4 shows the process steps of the maintenance mode of the deaerating device

In FIG. 4 the steps of the maintenance process for the cutting device with the cutting elements is shown (for clarity, the reference numbers that correspond to the technical features from FIG. 2 are omitted): Step 1: Device in parking position, cover closed.

Step 2: Actuator 1 opens the cover.

Step 3: Actuator 2 moves the movement device with cutting device from the parking position into the base position=maintenance position.

Step 4: Actuator 1 closes the cover.

Maintenance is now possible, cutting bar in base position=maintenance position.

Step 5: Actuator 1 opens the cover.

Step 6: Actuator 2 moves the movement device with cutting device from the base position=maintenance position into the parking position.

Step 7: Actuator 1 closes the cover, device in the parking position.

LIST OF REFERENCE NUMBERS

1 Blown film line
2 Extruder
3 Blowing head
4 Tubular film
5 Cooling ring
6 Calibration cage
7 Lay-flat device
8 Pair of take-off rolls
9 Takeoff device, takeoff, turner bar takeoff
10 Deaerating device
11 Roll
12 Machine control
14 Flattened tubular film
15 Frame of the takeoff device/takeoff
16 Cover
17 Movement device, pivot device
18 Actuator 1
19 Cutting device, Cutting bar
20 Actuator 2
21 Actuator 3
22 Cutting elements, blades
23 Pre-takeoff
24 Winder

The invention claimed is:

1. A device for production of a tubular film in a blown film method with a blown film line, the device comprising a lay-flat device and a take-off device with a pair of take-off rolls in which the tubular film can be flattened, and at least one deaerating device configured for deaerating a flattened tubular film,
wherein the at least one deaerating device comprises a movement device for a cutting device with cutting elements, arranged downstream of the pair of take-off rolls in a transport direction of the flattened tubular film, so that the flattened tubular film can be slit through both layers of the flattened tubular film and deaerated by the deaerating device, and
wherein the movement device is movable by at least one actuator so that the cutting device is movable between a parking position in a frame of the take-off device and a base position in front of the flattened tubular film.

2. The device according to claim 1, wherein the cutting device is movable by the at least one actuator so that the cutting device is movable from the base position into a cutting position, so that the cutting elements of the cutting device are configured to slit both layers of the flattened tubular film.

3. The device according to claim 1, wherein the movement device is arranged in front of a protection device, the protection device configured to be moved by a second actuator such that undesired interaction with the cutting device is prevented.

4. The device according to claim 1, wherein the at least one actuator is a pneumatic cylinder, a hydraulic cylinder, a motor, arranged in a linear guide, or designed as a lever configured for manual operation.

5. The device according to claim 1, wherein the cutting elements comprise a plurality of uniformly spaced blades.

6. The device according to claim 1, wherein the device is configured such that the flattened tubular film can be slit several times next to each other across the transport direction of the tubular film by the cutting elements.

7. The device according to claim 1, wherein the device is configured such that the flattened tubular film can be slit several times in succession transversely to the transport direction of the tubular film by the cutting elements.

8. The device according to claim 1, further comprising air pocket sensors arranged downstream of the pair of take-off rolls in the transport direction of the flattened tubular film.

9. The device according to claim 1, wherein the at least one deaerating device comprises a plurality of deaerating devices arranged downstream of the pair of take-off rolls.

10. The device according to claim 1, wherein the device is configured such that cutting parameters of the cutting device are adjustable and controlled via machine control of a blown film machine of the blown film line or via a separate control and wherein the cutting parameters include at least one of slit length, cutting time, number of successive cutting processes, blade spacing, and number of blades.

11. A method for production of a tubular film in a blown film method in a blown film line, the method comprising:
providing the device of claim 1;
producing a tubular film;
producing a flattened tubular film by flattening the tubular film in the lay-flat device;
pulling the flattened tubular film into the take-off device with the pair of take-off rolls; and
slitting both layers of the flattened tubular film and deaerating the flattened tubular film with the at least one deaerating device after pulling the flattened tubular film through the pair of take-off rolls.

12. The method according to claim 11, wherein the slitting comprises slitting of the flattened tubular film several times across the transport direction of the tubular film.

13. The method according to claim 11, wherein the slitting comprises slitting of the flattened tubular film once or several times in succession across the transport direction of the tubular film.

14. The method according to claim 11, wherein the slitting and deaerating include:
moving the movement device with the cutting device from the parking position into the base position;
moving the cutting device from the base position into a cutting position;
slitting both layers of the flattened tubular film and deaerating the flattened tubular film;
moving the cutting device from the cutting position into the base position; and
moving the movement device with the cutting device from the base position to the parking position.

15. The method according to claim 11, further comprising carrying out a maintenance process, the maintenance process including:
moving the movement device with the cutting device from the parking position into the base position, the base position corresponding to a maintenance position;
maintaining the cutting device and the cutting elements; and
moving the cutting device from the base position into the parking position.

16. A device for production of a tubular film in a blown film method with a blown film line, the device comprising a lay-flat device and a take-off device with a pair of take-off rolls in which the tubular film can be flattened, and at least one deaerating device configured for deaerating a flattened tubular film,
wherein the at least one deaerating device comprises a movement device for a cutting device with cutting elements, arranged downstream of the pair of take-off rolls in a transport direction of the flattened tubular film, so that the flattened tubular film can be slit through both layers of the flattened tubular film and deaerated by the deaerating device, and
wherein the movement device is arranged in front of a protection device, the protection device configured to be movable by at least one actuator such that undesired interaction with the cutting device is prevented.

17. A method for production of a tubular film in a blown film method in a blown film line, the method comprising:
providing the device of claim 16;
producing a tubular film;
producing a flattened tubular film by flattening the tubular film in the lay-flat device;
pulling the flattened tubular film into the take-off device with the pair of take-off rolls; and
slitting both layers of the flattened tubular film and deaerating the flattened tubular film with the at least one deaerating device after pulling the flattened tubular film through the pair of take-off rolls, wherein the slitting and deaerating include:
moving the movement device with the cutting device from a parking position into a base position in front of the flattened tubular film;
moving the cutting device from the base position into a cutting position;

slitting both layers of the flattened tubular film and deaerating the flattened tubular film;
moving the cutting device from the cutting position into the base position; and
moving the movement device with the cutting device from the base position to the parking position.

\* \* \* \* \*